United States Patent [19]

Ino et al.

[11] Patent Number: 5,590,001

[45] Date of Patent: Dec. 31, 1996

[54] BREATHER FILTER UNIT FOR MAGNETIC DISK DRIVE

[75] Inventors: Tsuneyori Ino; Tsuyoshi Furukawa; Masaki Jinbo; Hisashi Kaneko; Shinichi Fukuzawa; Masaharu Sugimoto; Yoshiaki Nagasawa; Katsuaki Ishida; Osamu Yamazaki; Yukihiro Komura, all of Kawasaki; Tomoo Sukagawa, Higashine, all of Japan

[73] Assignee: Fujitsu Limited, Japan

[21] Appl. No.: 346,370

[22] Filed: Nov. 29, 1994

[30] Foreign Application Priority Data

Mar. 15, 1994 [JP] Japan .................................. 6-044192
Apr. 19, 1994 [JP] Japan .................................. 6-080185

[51] Int. Cl.⁶ .................................................. G11B 33/14
[52] U.S. Cl. ............................................... 360/97.02
[58] Field of Search ......................................... 360/97.02

[56] References Cited

U.S. PATENT DOCUMENTS 4,863,499  9/1989  Osendorf ........................ 360/97.02 X
5,012,360  4/1991  Yamaguchi et al. ................. 360/97.02
5,075,807  12/1991  Inoue et al. ......................... 360/97.02
5,367,417  11/1994  Brown et al. ....................... 360/97.02
5,417,743  5/1995  Dauber .............................. 360/97.02 X

*Primary Examiner*—John H. Wolff
*Attorney, Agent, or Firm*—Greer, Burns & Crain, Ltd.

[57] ABSTRACT

A breather filter unit for a magnetic disk drive including a base and a cover fixed to the base, the cover having a vent. The breather filter unit includes a casing fixed to an inner surface of the cover, the casing having a vent inlet communicating with the vent of the cover and a vent outlet communicating with an inside of the magnetic disk drive, and a first filter contained in the casing at a position adjacent to the vent inlet, the first filter being formed from a plurality of fibers extending in a direction substantially parallel to that of an air flow from the vent inlet to the vent outlet. The breather filter unit further includes a second filter bonded to the casing so as to cover the vent outlet, and an activated carbon layer contained in the casing at a position between the first filter and the second filter.

8 Claims, 11 Drawing Sheets

5,590,001

BREATHER FILTER UNIT FOR MAGNETIC DISK DRIVE

BACKGROUND OF THE INVENTION

1. Field of the Invention

The present invention relates to a breather filter unit for a magnetic disk drive.

2. Description of the Related Art

In recent years, a magnetic disk drive as a kind of external storage for a computer have been increasingly made thinner and more compact with a reduced power consumption. Further, the improvement in recording density of a magnetic disk has also been desired and the number of magnetic disks to be mounted in the disk drive have also been increased for a large capacity. In general, a magnetic disk drive for a computer adopts a contact start and stop (CSS) system defining a relation between a magnetic head and a magnetic disk facing it. In this system, while the disk is being rotated, the head is kept flying above the disk at a microscopic height owing to the balance between a flying force applied to the head by an air flow generated by high-speed rotation of the disk and an elastic force of a spring arm pressing the head on the disk.

When the rotation of the magnetic disk is stopped, the head is moved to a contact allowed zone on the disk and then comes into contact with the disk. When the rotation of the disk is stopped, the head is kept in contact with the disk. Thus, during the rotation of the disk, the head is kept flying above the disk at a microscopic height. Accordingly, dust or the like even in a small amount can cause head crash or the like. To cope with this problem, magnetic disks and a head actuator for writing/reading data on the magnetic disks are contained in a sealed disk enclosure (housing).

However, it is difficult to maintain a sealed condition inside the magnetic disk drive for a long time, and the flying height of each magnetic head changes with variations in pressure inside the disk drive due to a temperature change or the like. To prevent this, a small vent is formed through a cover of the magnetic disk drive to make the pressure inside the disk drive substantially equal to the pressure outside the disk drive. A breather filter is usually mounted at the small vent to thereby prevent dust from entering the inside of the disk drive through the small vent. However, such a breather filter generally used in the related art allows water vapor, corrosive gas, etc. to pass into the inside of the disk drive. Some techniques for solving this problem have been proposed. U.S. Pat. No. 4,751,594 discloses a narrow long air passage for suppressing the entry of water vapor into the inside of the disk drive due to diffusion of the air.

Further, Japanese Patent Laid-open No. 60-147983 discloses a restriction and a drying agent provided in an air passage to prevent the entry of water vapor into the inside of the disk drive. Japanese Patent Laid-open No. 5-109260 discloses a filter assembly (filter unit) formed by combining a nonwoven fabric, a metal-coated filter, and activated carbon and mounted in the disk drive to remove harmful gas molecules in the disk drive.

The corrosive gas contained in the air entering the magnetic disk drive oxidizes the disk surface and a magnetic head transducer to shorten the life of the disk and the magnetic head. It is known that activated carbon is provided in the magnetic disk drive to trap the corrosive gas. In a large-sized magnetic disk drive such as a 8-inch magnetic disk drive or a 5.25-inch magnetic disk drive, it is possible to provide a sufficient amount of activated carbon and drying agent in the disk drive. However, in a small-sized magnetic disk drive such as a 3.5-inch magnetic disk drive, it is impossible to provide a sufficient amount of activated carbon and/or drying agent in the disk drive because of its limited installation space. If the amount of activated carbon is small, the ability of the activated carbon to adsorb the corrosive gas disappears soon and the life of the activated carbon is shortened.

In the technique disclosed in U.S. Pat. No. 4,751,594, a narrow long air passage is formed to suppress the entry of water vapor, corrosive gas, etc. into the disk drive. However, as the air passage is long, a ventilation device becomes complex and large. Furthermore, the mere formation of the narrow long air passage cannot prevent the entry of the air into the disk drive due to a pressure difference between the inside and the outside of the disk drive. Further, the technique of merely mounting a restriction and a drying agent in a vent as disclosed in Japanese Patent Laid-open No. 60-147983 is unsatisfactory for a reduction in diffusion of the air. In this technique, however, the drying agent adsorbs not only the water vapor entering the inside of the magnetic disk drive, but also the water vapor present outside the disk drive, thus causing a decrease in the life of the drying agent.

Although the amount of the drying agent may be increased to extend the life of the drying agent, it is impossible, particularly in a small-sized magnetic disk drive having a limited installation space, to provide the drying agent in such an amount as to match the life of the disk drive. A technique that can be readily analogized from this literature is mounting of activated carbon in the vent. However, the mere mounting of the activated carbon in the vent causes a decrease in the life of the activated carbon. The activated carbon whose life is over allows the corrosive gas to pass into the magnetic disk drive.

The filter unit described in Laid-Open Japanese Patent No. 5-109260 is a filter for removing harmful gas circulating in the magnetic disk drive, but not a breather filter designed to be mounted in the vent. In such a filter unit, water vapor and corrosive gas outside the disk drive are allowed to enter the inside of the disk drive because the inside and the outside of the disk drive are in communication with each other through the vent. Furthermore, after water vapor and corrosive gas spread over the inside of the disk drive, the filter unit starts adsorbing the water vapor and the corrosive gas. Accordingly, much time is required for complete adsorption, thus adversely affecting the disk and the head. In addition, since the inside and the outside of the disk drive are in communication with each other through the vent, the filter unit continues to always adsorb the water vapor and the corrosive gas existing outside the disk drive, causing a decrease in the life of the filter unit. To extend the life, the size of the filter unit must be enlarged.

SUMMARY OF THE INVENTION

It is therefore an object of the present invention to provide a breather filter unit for a magnetic disk drive which can remove metal corrosive gas by adsorption for a long time with a small size and a simple structure.

It is another object of the present invention to provide a magnetic disk drive which can effectively prevent dust and metal corrosive gas from entering the inside of the magnetic disk drive.

In accordance with an aspect of the present invention, there is provided a breather filter unit for a magnetic disk drive including a base and a cover fixed to said base, said cover having a vent, said breather filter unit comprising a casing fixed to an inner surface of said cover, said casing having a vent inlet communicating with said vent of said cover and a vent outlet communicating with an inside of said magnetic disk drive, said vent outlet being opposed to said vent inlet; a first filter contained in said casing at a position adjacent to said vent inlet, said first filter comprising a plurality of fibers extending in a direction substantially parallel to that of an air flow from said vent inlet toward said vent outlet; a second filter bonded to said casing so as to cover said vent outlet; and an activated carbon layer contained in said casing at a position between said first filter and said second filter.

In accordance with another aspect of the present invention, there is provided a breather filter unit for a magnetic disk drive including a base and a cover fixed to said base, said cover having a vent, said breather filter unit comprising a casing fixed to an inner surface of said cover, said casing having a vent inlet communicating with said vent of said cover and a vent outlet communicating with an inside of said magnetic disk drive, said vent outlet being opposed to said vent inlet; a first filter contained in said casing at a position adjacent to said vent inlet, said first filter comprising a plurality of fibers extending in a direction substantially parallel to that of an air flow from said vent inlet toward said vent outlet; and a filter bag contained in said casing at a position adjacent to said vent outlet, said filter bag containing activated carbon therein.

According to the present invention, the first filter in the fibrous form functions to reduce a diffusion effect of air in a narrow space, thereby extending the life of the activated carbon. Accordingly, metal corrosive gas entering the inside of the magnetic disk drive can be removed by adsorption by the activated carbon for a long time. When there is a pressure difference between the inside and the outside of the magnetic disk drive, the pass of air through the fibrous first filter causes generation of a large pressure loss to moderate the pass of air through the vent, thereby extending the life of the activated carbon. As a result, the amount of the activated carbon required can be reduced and an installation space for the breather filter unit can therefore be reduced.

In accordance with a further aspect of the present invention, there is provided a magnetic disk drive comprising a housing substantially hermetically containing a magnetic disk and a magnetic head for recording and reproducing data to and from said magnetic disk, said housing having a breather hole for providing communication between an inside of said housing and an outside of said housing; a breather filter unit mounted on said housing so as to be opposed to said breather hole of said housing, said breather filter unit comprising a unit body fixed to said housing, said unit body having a first small hole, and a unit cover for defining an expansion chamber in cooperation with said unit body, said unit cover having a second small hole, said expansion chamber communicating with said inside of said housing through said first small hole and said breather hole and communicating with said outside of said housing through said second small hole; and a dust filter provided between said breather filter unit and said housing, for preventing dust from passing through said breather hole.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described with reference to the drawings.

Figure 1:
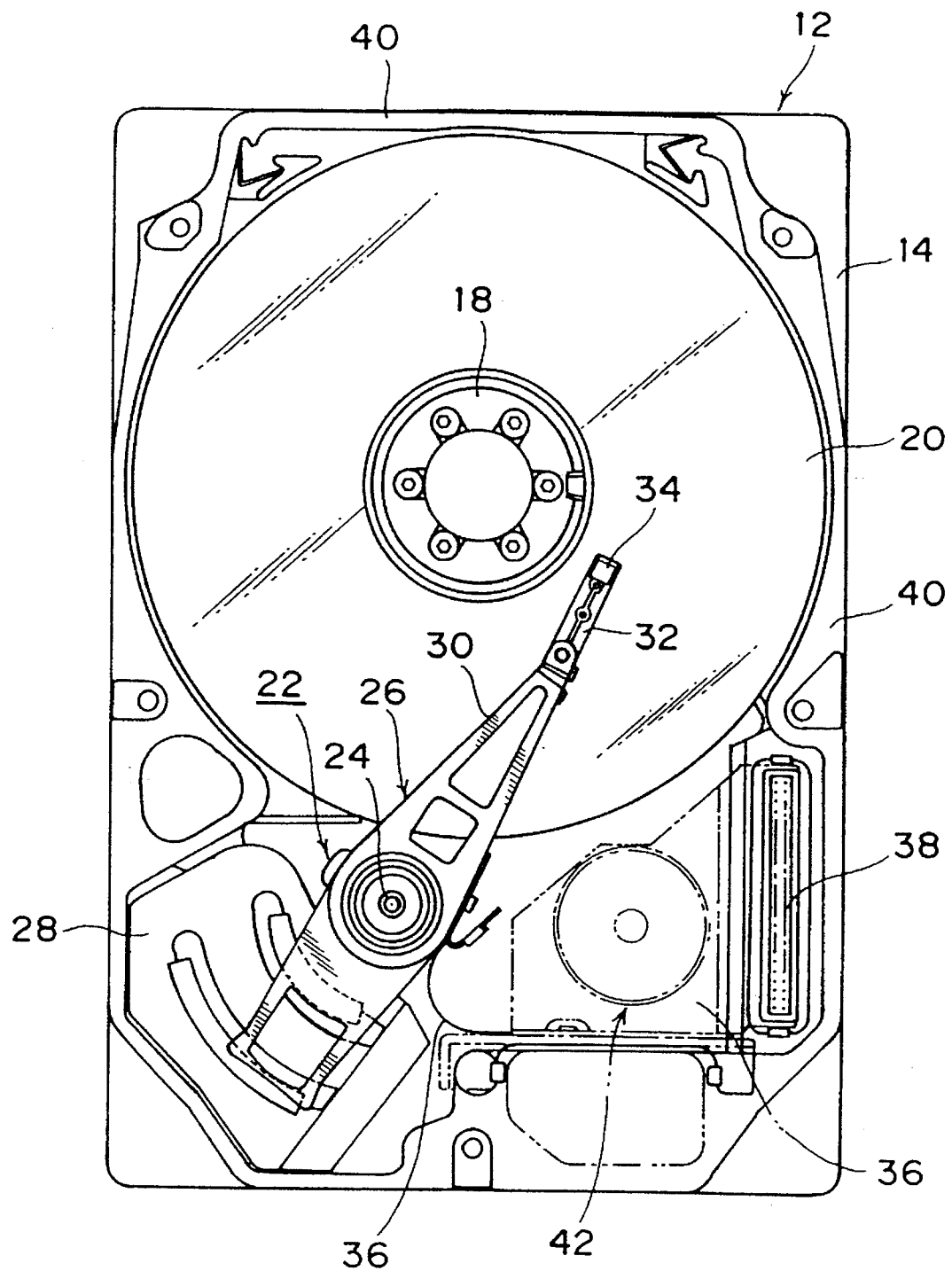
FIG. 1 is a schematic plan view of a magnetic disk drive having a breather filter unit according to the present invention in the condition where a cover of the disk drive is removed.
Figure 2:
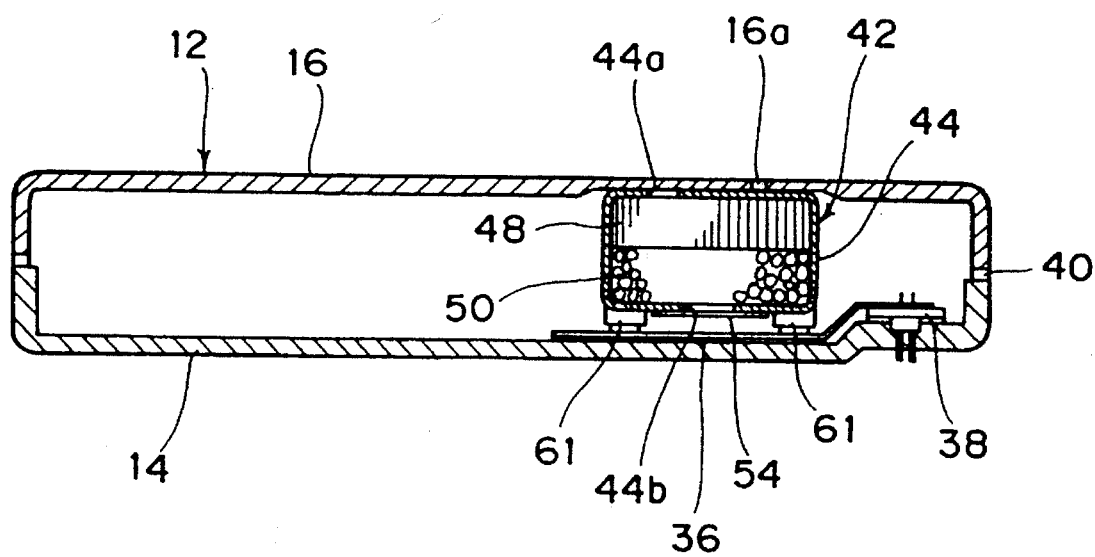
FIG. 2 is a sectional view of a housing of the magnetic disk drive taken along a line lying on the breather filter unit shown in FIG. 1, with magnetic disks, a head actuator, etc. being omitted.

Referring to FIG. 1, there is shown a plan view of a magnetic disk drive having a breather filter unit 42 according to a first preferred embodiment of the present invention. Referring to FIGS. 1 and 2, reference numeral 12 denotes a housing (enclosure) composed of a base 14 and a cover 16. A spindle hub to be rotatably driven by an inner hub motor not shown is provided on the base 14. A plurality of magnetic disks 20 and spacers not shown are alternately stacked and mounted on the spindle hub. That is, the plurality of magnetic disks 20 are regularly spaced from each other and are mounted on the spindle hub by fixing a disk clamp 18 to the spindle hub.

Reference numeral 22 denotes a rotary head actuator composed of an actuator arm assembly 26 and a magnetic circuit 28. The actuator arm assembly 26 is rotatably mounted on a shaft 24 fixed to the base 14, and has a plurality of head actuator arms 30 extending in one direction from the center of rotation. A spring arm 32 supporting a magnetic head 34 is fixed to an end portion of each head actuator arm 30.

Reference numeral 36 denotes a flexible printed wiring sheet for outputting a signal from each magnetic head 34. The flexible printed wiring sheet 36 is fixed at its one end to the head actuator arms 30 and is electrically connected at the other end to a connector 38. An annular packing assembly 40 is mounted on the base 14. As shown in FIG. 2, the cover 16 is fixed to the base 14 by screws with the annular packing assembly 40 interposed therebetween, thus sealing the housing 12.

Referring to FIG. 2, there is shown a sectional view of the housing 12 of the magnetic disk drive as taken along a line (not shown) lying on the breather filter unit 42. In FIG. 2, the breather filter unit 42 and the housing 12 are mainly shown, and other elements including the magnetic disks 20 and the head actuator 22 are not shown for the simplicity of illustration. The cover 16 is formed with a vent 16a, and the breather filter unit 42 having a vent inlet 44a communicating with the vent 16a is bonded to the inner surface of the cover 16 by means of a double-sided adhesive tape which will be hereinafter described.

Figure 3:
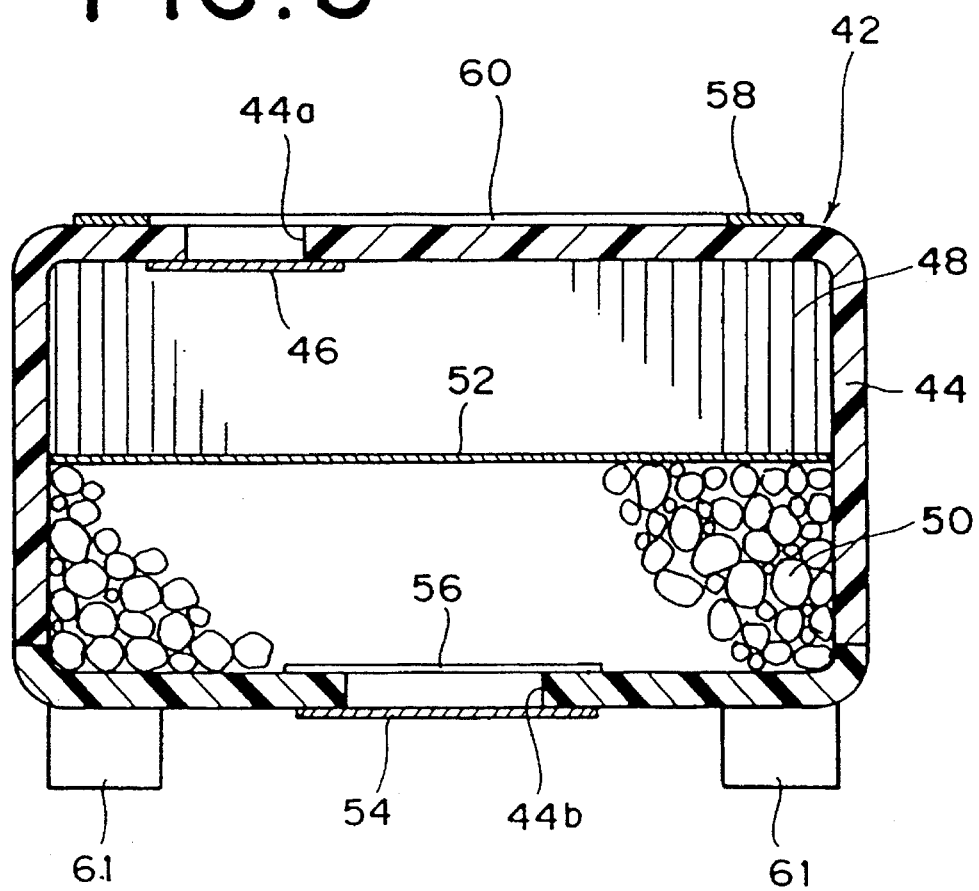
FIG. 3 is a sectional view of a breather filter unit according to a first preferred embodiment of the present invention.
Figure 4:
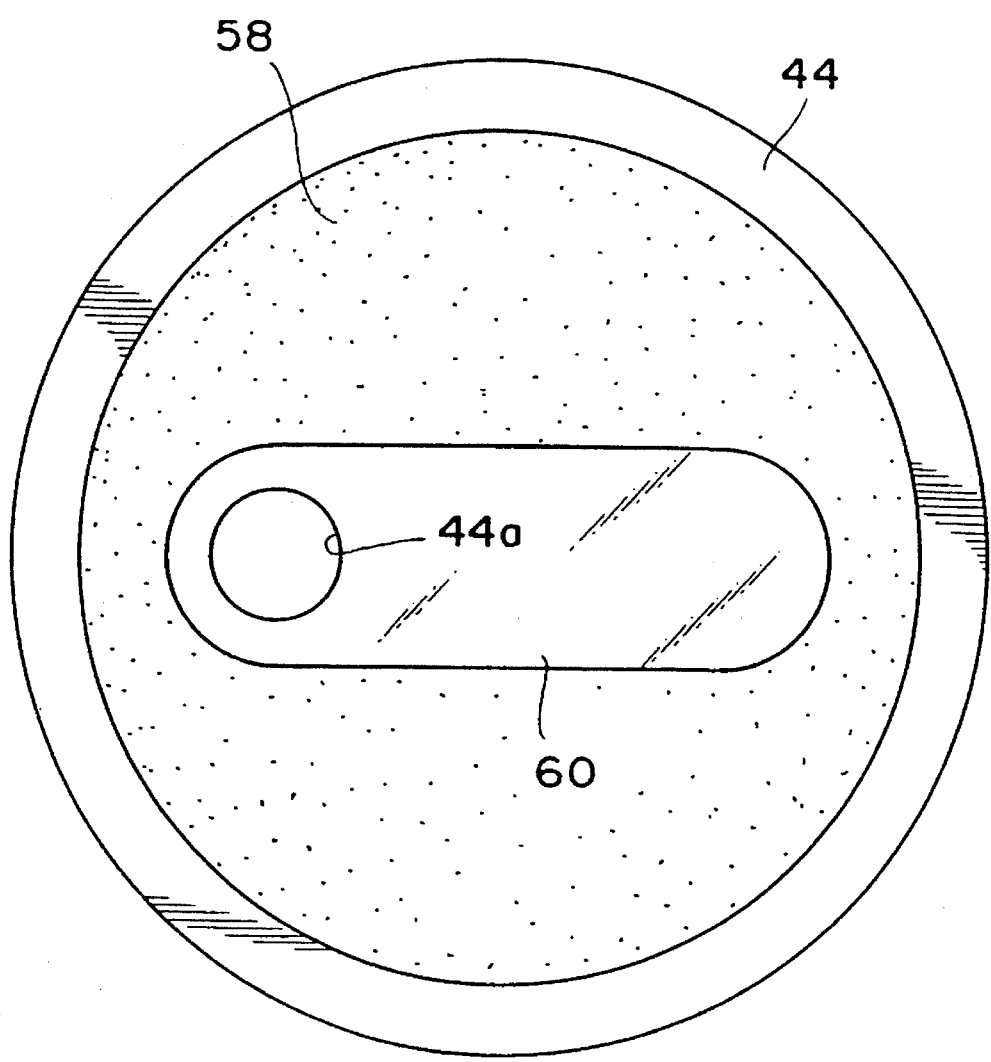
FIG. 4 is a plan view of the breather filter unit according to the first preferred embodiment.

The structure of the breather filter unit 42 will now be described in detail with reference to FIGS. 3 and 4. Reference numeral 44 denotes a casing of the breather filter unit 42. The casing 44 is formed with a vent inlet 44a communicating with the vent 16a of the cover 16 and a vent outlet 44b communicating with the inside of the magnetic disk drive. The vent inlet 44a and the vent outlet 44b are formed through opposed walls of the casing 44. A double-sided adhesive tape 58 defining an air passage 60 is attached to the outer upper surface of the casing 44, and the breather filter unit 42 is bonded through the double-sided adhesive tape 58 to the inner surface of the cover 16.

The breather filter unit 42 is bonded to the cover 16 at a given position such that the vent 16a of the cover 16 communicates with the vent inlet 44a of the casing 44 through the air passage 60 of the double-sided adhesive tape 58. The double-sided adhesive tape 58 is elastic so that it seals the inside of the magnetic disk drive and allows ventilation between the inside and the outside of the magnetic disk drive only through the breather filter unit 42.

A filter 46 is bonded to the inner surface of the casing 44 so as to cover the vent inlet 44a, and a filter 54 is bonded to the outer surface of the casing 44 so as to cover the vent outlet 44b. The filters 46 and 54 are formed of polytetrafluoroethylene, for example. In this preferred embodiment, GTAFL9314, the trade name for polytetrafluoroethylene manufactured by GORE-TEX INC., was used for the filters 46 and 54. These filters remove particles each having a size of 0.1 μm or more with an efficiency of 99.9999%.

A fibrous filter or nonwoven fabric filter 48 is contained in the casing 44 at a position adjacent to the vent inlet 44a. The fibrous filter 48 is bonded to the inner surface of the casing 44. The fibrous filter 48 is formed by bonding a plurality of fibers composed of noncrystalline rayon having a crystallinity of about 15% and iron phthalocyanine added thereto in a proportion of 3 wt %, and bundling these fibers to have a diameter of about 20 mm. Each fiber forming the fibrous filter 48 extends in a direction substantially parallel to the direction of an air flow from the vent inlet 44a toward the vent outlet 44b.

An activated carbon layer 50 is contained in the casing 44 at a position between the fibrous filter 48 and the filter 54. The activated carbon layer 50 functions to remove by adsorption corrosive gas contained in the air passing through the breather filter unit 42. Silica gel may be mixed in the activated carbon layer 50. Although the proportion of mixing of silica gel is not specifically limiting, it is desirable to mix about 50% of silica gel in the activated carbon layer 50. The silica gel functions to mainly remove by adsorption water vapor contained in the air passing through the breather filter unit 42.

In this preferred embodiment, another filter 52 is interposed between the fibrous filter 48 and the activated carbon layer 50. The filter 52 functions to prevent the activated carbon in the layer 50 from entering the fibrous filter 48, but it may not be provided. The filter 52 is formed of a material similar to that of the filters 46 and 54. A protective net 56 is bonded to the inner surface of the casing 44 so as to cover the vent outlet 44b. The protective net 56 functions to prevent the filter 54 from being damaged by the activated carbon in the layer 50. A plurality of projections 61 are formed on the outer surface of the casing 44 at a bottom wall thereof. These projections 61 function to press the flexible printed wiring sheet 36 as shown in FIG. 2, thereby preventing floating of the sheet 36.

In operation, the outside air having entered the vent 16a of the cover 16 is introduced through the air passage 60 and the vent inlet 44a to pass through the filter 46. The air having passed through the filter 46 is allowed to pass through the fibrous filter 48 and come into the activated carbon layer 50. The fibrous filter 48 functions to suppress diffusion of the flowing air in the activated carbon layer 50, thereby preventing shortening of the life of the activated carbon, and also functions to increase a pressure loss of the flowing air, thereby limiting communication of the air.

The air having passed through the fibrous filter 48 is introduced through the filter 52 into the activated carbon layer 50, in which corrosive gas in the air is removed by the activated carbon by adsorption. Then, the air from which the corrosive gas has been removed by the activated carbon is allowed to pass through the filter 54 and enter the magnetic disk drive. The filter 54 functions to prevent the activated carbon in the form of powder from entering the magnetic disk drive. Since there hardly exists corrosive gas in the magnetic disk drive, the life of the activated carbon is hardly shortened by diffusion of the air in the activated carbon layer 50 flowing from the inside to the outside of the magnetic disk drive. Therefore, it is unnecessary to provide a filter having a function similar to that of the fibrous filter 48 on the vent outlet 44b side.

Figure 5:
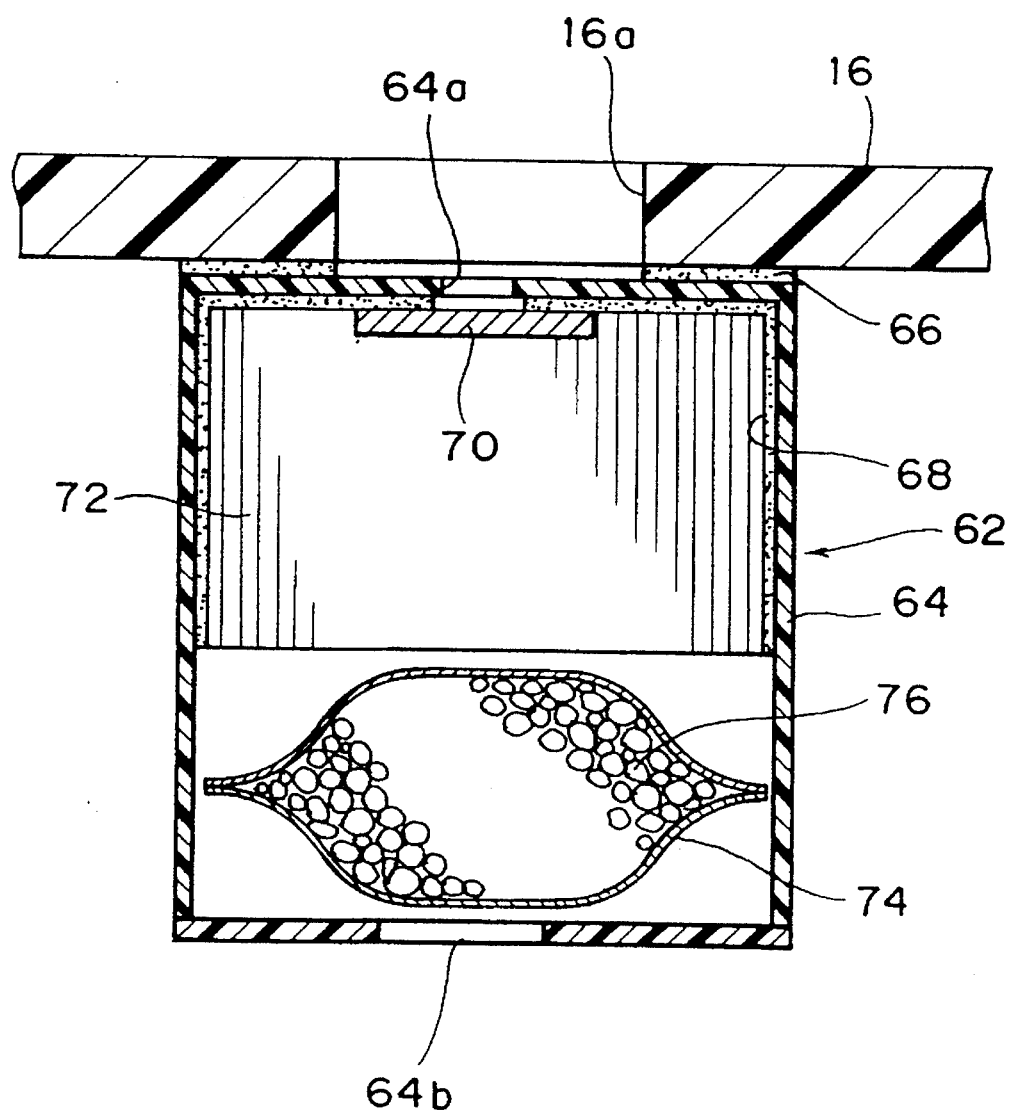
FIG. 5 is a sectional view of a breather filter unit according to a second preferred embodiment of the present invention.

Referring to FIG. 5, there is shown a sectional view of a breather filter unit 62 according to a second preferred embodiment of the present invention. The breather filter unit 62 according to this preferred embodiment is improved in assembly workability. As similar to the first preferred embodiment, a casing 64 of the breather filter unit 62 has a vent inlet 64a communicating with the vent 16a of the cover 16 and a vent outlet 64b communicating with the inside of the magnetic disk drive. The casing 64 is bonded to the inner surface of the cover 16 by means of an elastic double-sided adhesive tape 66. A filter 70 is bonded to the inner surface of the casing 64 by means of a double-sided adhesive tape 68 so as to cover the vent inlet 64a of the casing 64. Further, a fibrous filter 72 similar to the fibrous filter 48 in the first preferred embodiment is bonded to the inner surface of the casing 64 by the double-sided adhesive tape 68.

In this preferred embodiment, it is featured that a filter bag 74 containing activated carbon 76 is contained in the casing 64 at a position adjacent to the vent outlet 64*b*. The filter bag 74 is manufactured by putting the activated carbon 76 into an open filter bag element and then closing an opening edge of the element by heat sealing. The filter bag 74 used in this preferred embodiment is formed from GORE-SORBER, the trade name for a product by GORE-TEX INC. According to this preferred embodiment, the activated carbon 76 is contained in the filter bag 74. Therefore, the assembly workability of the breather filter unit 62 can be greatly improved. The breather filter unit 62 also has an effect similar to that of the first preferred embodiment. Also in the second preferred embodiment, silica gel may be mixed with the activated carbon 76 in the filter bag 74.

In both of the first and second preferred embodiments, it is desirable to set the breather filter units 42 and 62 so that the vent outlets 44*b* and 64*b* of the breather filter units 42 and 62 are located at a position where the air pressure is slightly lower than that outside the magnetic disk drive during rotation of the magnetic disks. Although the fibrous filters 48 and 72 are used in the first and second preferred embodiments, they may be replaced by filters formed from a porous substance such as foamed urethane and porous ceramic.

Figure 6:
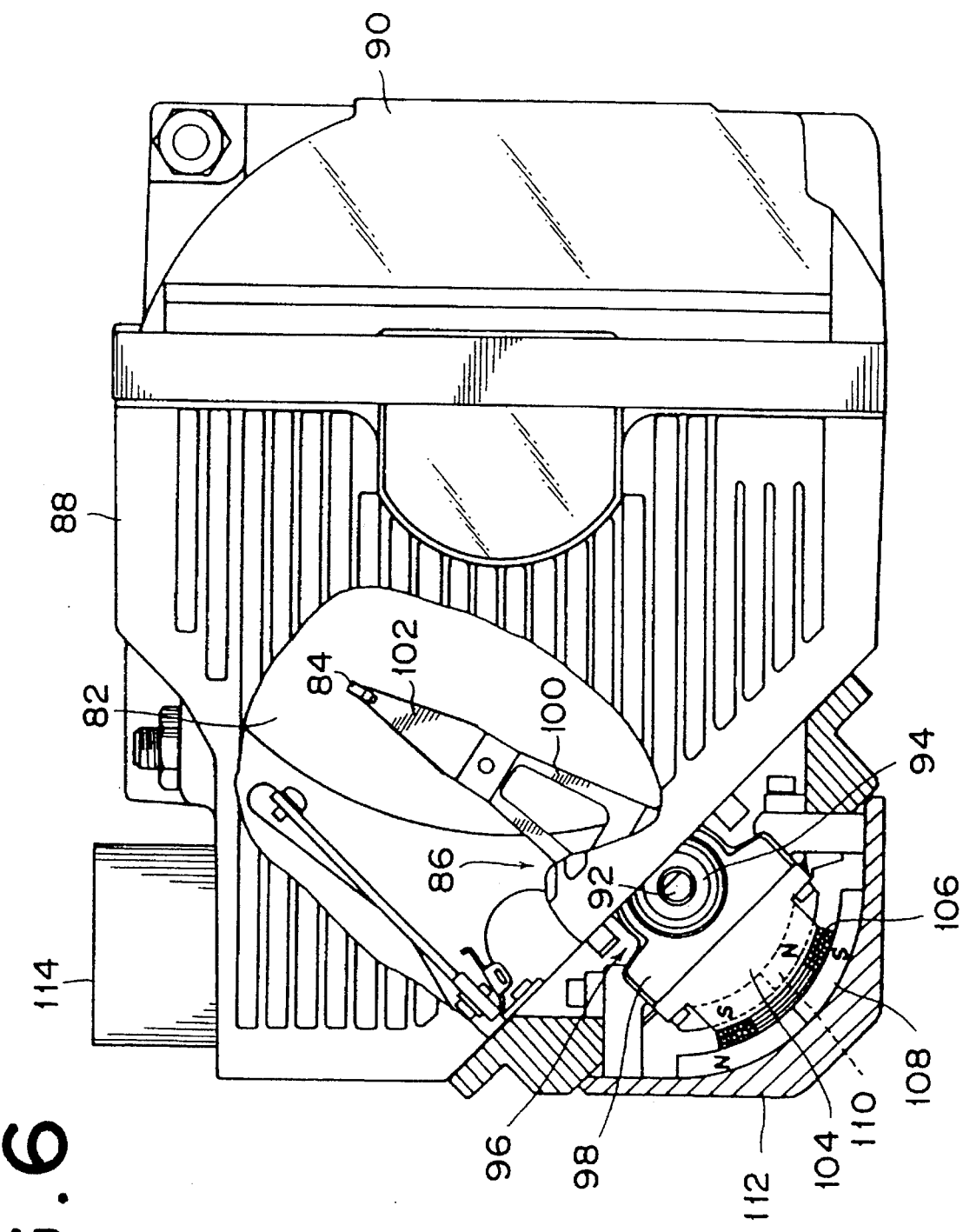
FIG. 6 is a partially sectional, plan view of another type of magnetic disk drive having a breather filter unit according to the present invention.

FIG. 6 is a partially sectional, plan view of another type of magnetic disk drive to which the present invention is applied. Reference numeral 88 denotes a housing of the magnetic disk drive. The housing 88 contains a plurality of magnetic disks 82, a plurality of magnetic heads 84 for recording and reproducing data to and from the magnetic disks 82, and a rotary head actuator 86 for supporting the magnetic heads 84 and moving them between tracks on the magnetic disks 82. Reference numeral 90 denotes a cover for tightly closing the housing 88. The head actuator 86 includes an actuator arm assembly 96 rotatably mounted on a shaft 92 through a bearing 94. The actuator arm assembly 96 is composed of an actuator block 98 rotatable about the shaft 92 and a plurality of actuator arms 100 extending from the actuator block 98 substantially perpendicularly to the shaft 92.

The magnetic heads 84 are mounted through a plurality of spring arms 102 to the front ends of the actuator arms 100, so that when the magnetic disks 82 are in a stopped condition, the magnetic heads 84 are pressed on the corresponding magnetic disks 82 by the elastic restoring forces of the spring arms 102. During rotation of the magnetic disks 82, the magnetic heads 84 are kept flying from the corresponding magnetic disks 82 at such a height that the flying forces generated by the air flows between the magnetic heads 84 and the corresponding magnetic disks 82 balance the elastic forces of the spring arms 102.

A supporting member 104 is provided on the actuator block 98 on the side substantially opposite to the actuator arms 100. A coil 106 is fixed by bonding or the like to an outer circumferential portion of the supporting member 104. Permanent magnets 108 and 110 are provided on the outside and the inside of the coil 106, respectively, to generate a magnetic field for obtaining a driving force of the head actuator 86 by the interaction with a current flowing in the coil 106. Reference numeral 112 denotes a yoke for forming a magnetic circuit including the permanent magnets 108 and 110. The magnetic circuit generates a magnetic flux in the radial direction between the permanent magnets 108 and 110. The magnetic flux crosses a winding portion of the coil 106 parallel to the shaft 92, thereby generating the driving force of the head actuator 86. Reference numeral 114 denotes a breather filter unit featured in the present invention. The breather filter unit 114 is mounted on the housing 88 removably therefrom, for example. Various structures of the breather filter unit 114 will be hereinafter described.

Figure 7:
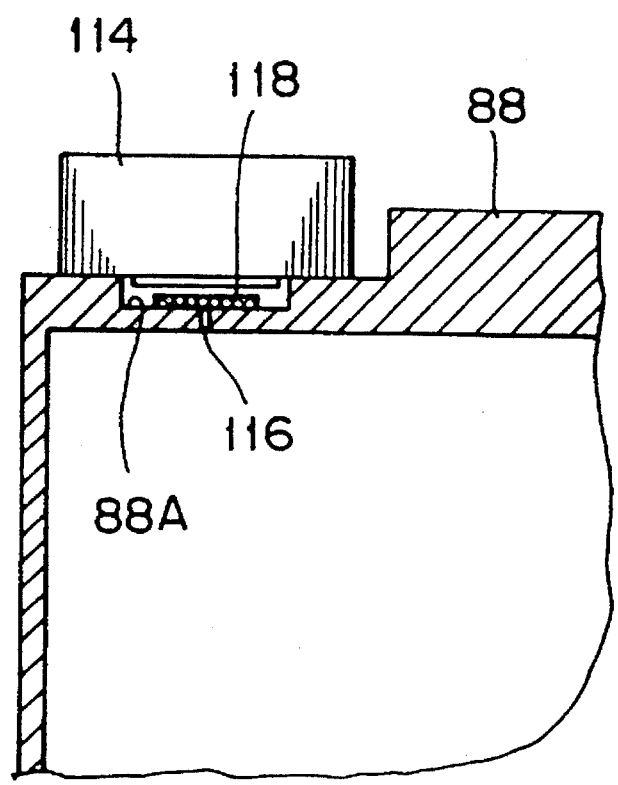
FIG. 7 is a sectional view of a mounting portion for the breather filter unit in the magnetic disk drive shown in FIG. 6.

FIG. 7 is a sectional view of a mounting portion for the breather filter unit 114 in the magnetic disk drive shown in FIG. 6. The housing 88 is formed with a thin-walled portion 88A, and the thin-walled portion 88A is formed with a breather hole 116 having a diameter of 1 mm, for example. The breather filter unit 114 is so located as to be opposed to the breather hole 116. A dust filter 118 is provided between the breather filter unit 114 and the housing 88. The dust filter 118 functions to prevent dust from passing through the breather hole 116. The dust filter 118 is attached to the thin-walled portion 88A, for example.

The reason why the dust filter 118 is directly mounted on the housing 88 is that the breather filter unit 114 is to be made replaceable in general environment. That is, when removing the breather filter unit 114 from the housing 88 in general environment, the entry of dust from the outside to the inside of the magnetic disk drive can be prevented by attaching the dust filter 118 directly to the thin-walled portion 88A as in this preferred embodiment.

Figure 8A:
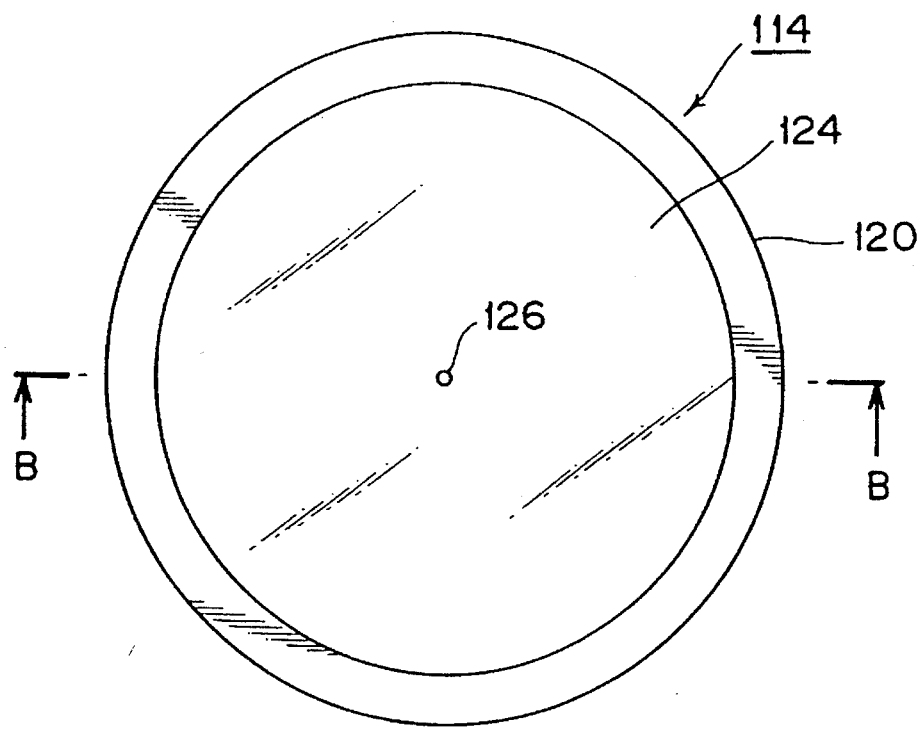
FIG. 8A is a plan view of a breather filter unit according to a third preferred embodiment of the present invention.
Figure 8B:
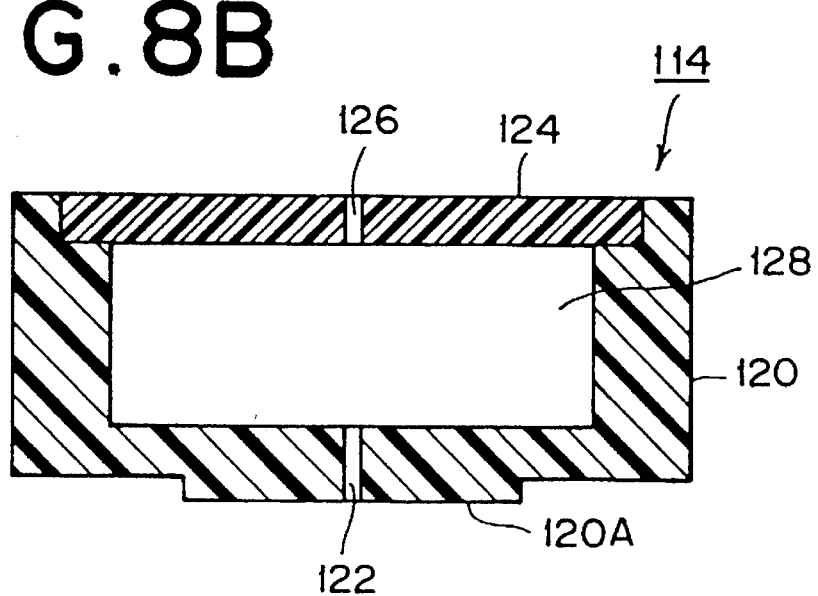
FIG. 8B is a cross section taken along the line B—B in FIG. 8A.

FIG. 8A is a plan view of the breather filter unit 114 according to a third preferred embodiment of the present invention, and FIG. 8B is a cross section taken along the line B—B in FIG. 8A. The breather filter unit 114 has a substantially cylindrical unit body 120 generally closed at its bottom on the housing side. The bottom of the unit body 120 is formed with a thick-walled portion 120A, and the thick-walled portion 120A is formed at its substantially central position with a first small hole 122. Reference numeral 124 denotes a unit cover for defining an expansion chamber 128 in cooperation with the unit body 120. The unit cover 124 is fitted with the top of the unit body 120. The unit cover 124 is formed at its substantially central position with a second small hole 126 having substantially the same diameter as that of the first small hole 122.

When the air pressure in the magnetic disk drive is increased upon starting of a spindle motor for rotating the magnetic disks or by the influence of heat generation in the magnetic disk drive, the air in the magnetic disk drive is relieved through the second small hole 122 into the expansion chamber 128, and then stays in this chamber 128. Conversely, when the air pressure in the magnetic disk drive is decreased upon stopping of the spindle motor or by a reduction in temperature in the magnetic disk drive, the air staying in the expansion chamber 128 is introduced through the first small hole 122 into the magnetic disk drive. In this manner, there is no possibility that metal corrosive gas contained in the air outside the magnetic disk drive may enter the inside of the magnetic disk drive even when there occurs a pressure difference between the inside and the outside of the magnetic disk drive. Further, in a steady state where such a pressure difference is absent, the metal corrosive gas outside the magnetic disk drive may enter the expansion chamber 128 through the second small hole 126 by diffusion only. However, the amount of the corrosive gas to enter is very small, so that no adverse effects are given.

Figure 9:
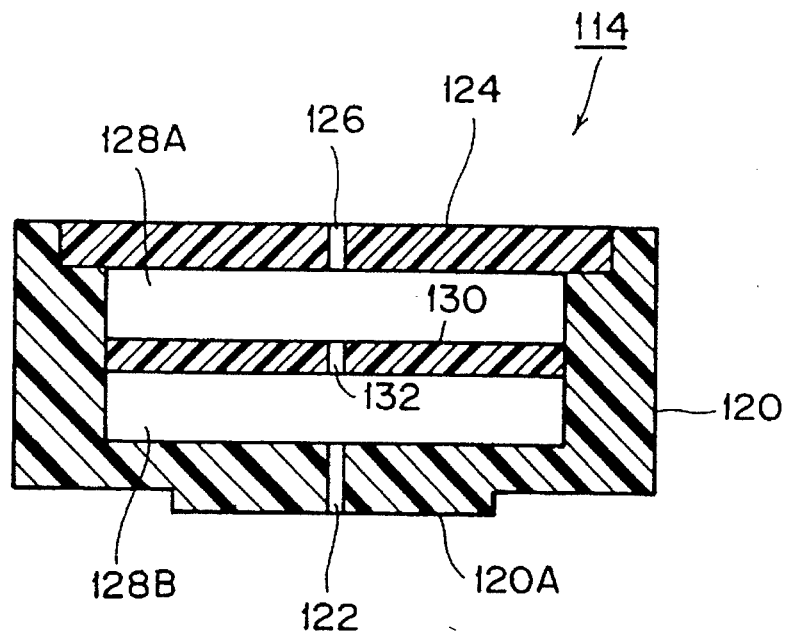
FIG. 9 is a sectional view of a breather filter unit according to a fourth preferred embodiment of the present invention.

FIG. 9 is a sectional view of the breather filter unit 114 according to a fourth preferred embodiment of the present invention. The breather filter unit 114 according to this preferred embodiment is featured by the point that it is further provided with a unit wall 130 for dividing the expansion chamber defined by the unit body 120 and the unit cover 124 into two sections (i.e., a first expansion chamber 128A and a second expansion chamber 128B). The unit wall 130 is formed at its substantially central position with a third small hole 132 having substantially the same diameter as that of the first and second small holes 122 and 126.

According to this preferred embodiment, the expansion chamber is divided into two sections, thereby more suppressing the entry of metal corrosive gas by diffusion from the outside into the inside of the magnetic disk drive in the steady state thereof. To make this effect more remarkable, the expansion chamber may be divided into three or more sections. The diameter of each of the small holes 122, 126, and 132 is preferably set in the range of 0.5 mm to 1.0 mm. If the diameter is less than 0.5 mm, the formation of each small hole by machining is difficult, whereas if the diameter is greater than 1.0 mm, the diffusion of metal corrosive gas is liable to occur. Further, the reason why the thick-walled portion 120A is formed at the bottom of the unit body 120 is that the length of the second small hole 122 is to be increased enough to well prevent the entry of metal corrosive gas into the inside of the magnetic disk drive by diffusion.

Figure 10:
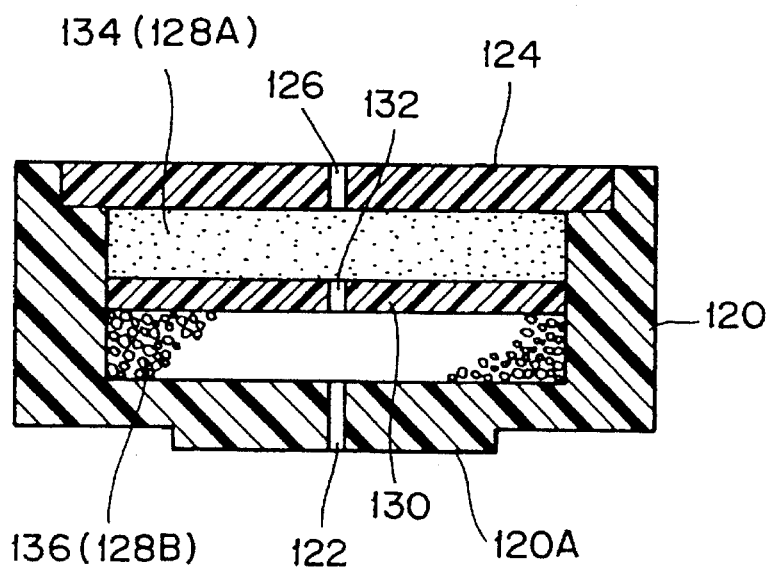
FIG. 10 is a sectional view of a breather filter unit according to a fifth preferred embodiment of the present invention.

FIG. 10 is a sectional view of the breather filter unit 114 according to a fifth preferred embodiment of the present invention. In contrast to the fourth preferred embodiment shown in FIG. 9, the breather filter unit 114 according to the fifth preferred embodiment is featured by the point that it is further provided with a drying agent 134 and a gas filter 136 contained in the first expansion chamber 128A and the second expansion chamber 128B, respectively. The gas filter 136 functions to adsorb metal corrosive gas contained in the air entered from the outside of the magnetic disk drive. The drying agent 134 functions to remove moisture (water vapor) contained in the air entered from the outside of the magnetic disk drive. The drying agent 134 is silica gel, for example, and the gas filter 136 contains activated carbon, for example, as a main component.

According to this preferred embodiment, even when the air outside the magnetic disk drive enters the inside thereof, moisture and metal corrosive gas contained in the air can be removed to thereby greatly contribute to prevention of head crash. The reason why the drying agent 134 is contained in the first expansion chamber 128A rather than the second expansion chamber 128B is that the life of the gas filter 136 is to be more extended as compared with the case where the gas filter 136 would be contained in the first expansion chamber 128A.

Figure 11:
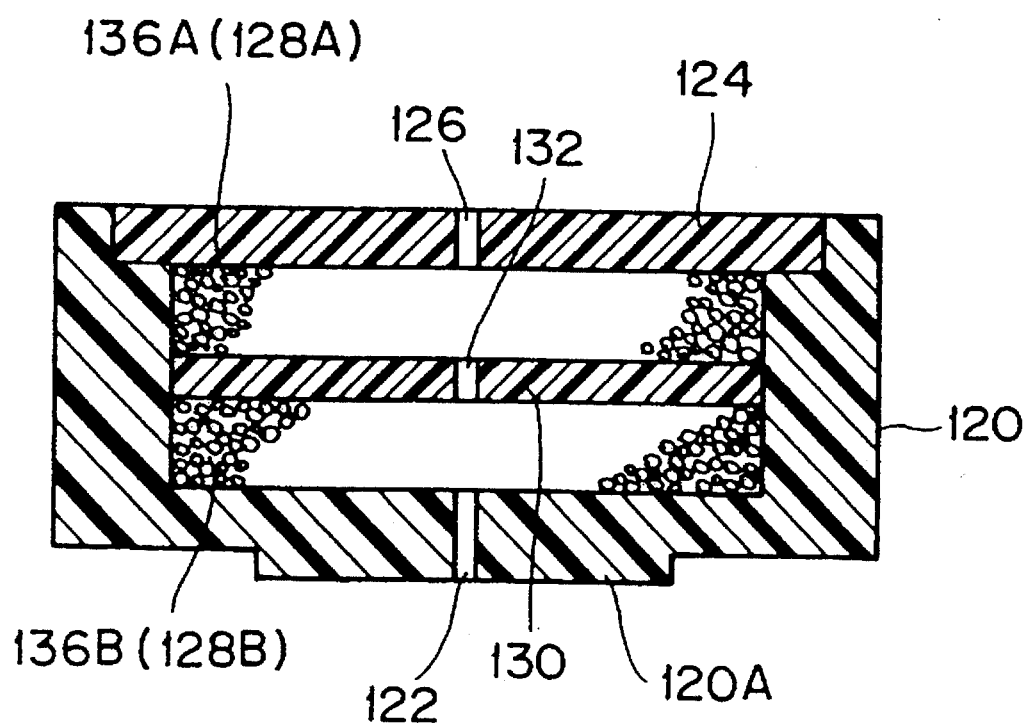
FIG. 11 is a sectional view of a breather filter unit according to a sixth preferred embodiment of the present invention.

FIG. 11 is a sectional view of the breather filter unit 114 according to a sixth preferred embodiment of the present invention. In this preferred embodiment, a first gas filter 136A and a second gas filter 136B are contained in the first expansion chamber 128A and the second expansion chamber 128B, respectively. The second gas filter 136B corresponds to the gas filter 136 in the fifth preferred embodiment shown in FIG. 10. The first and second gas filters 136A and 136B functions to adsorb different kinds of metal corrosive gases. For example, the first gas filter 136A is capable of well adsorbing carbon dioxide, and the second gas filter 136B is capable of well adsorbing sulfur dioxide.

Figure 12A:
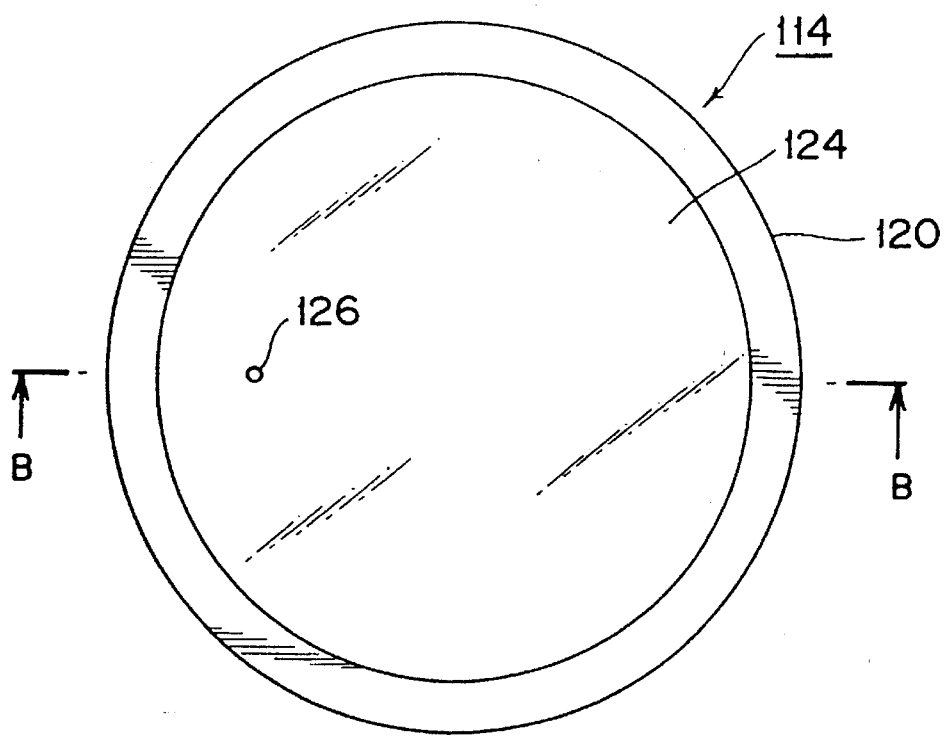
FIG. 12A is a plan view of a breather filter unit according to a seventh preferred embodiment of the present invention.
Figure 12B:
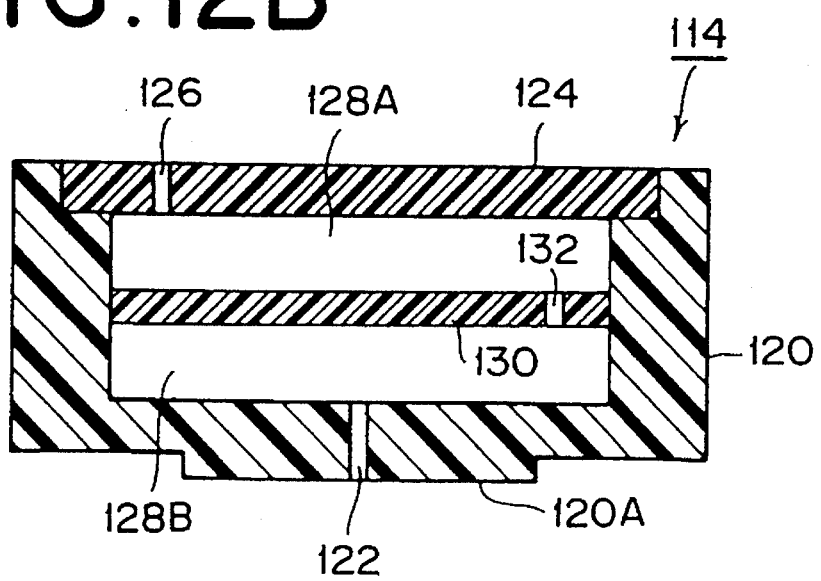
FIG. 12B is a cross section taken along the line B—B in FIG. 12A.

FIG. 12A is a plan view of the breather filter unit 114 according to a seventh preferred embodiment of the present invention, and FIG. 12B is a cross section taken along the line B—B in FIG. 12A. In contrast to the fourth preferred embodiment shown in FIG. 9, the breather filter unit 114 according to the seventh preferred embodiment is featured by the point that the first, second, and third small holes 122, 126, and 132 are nonlinearly arranged. In other words, the small holes 122, 126, and 132 are not aligned with each other. Although not shown in FIGS. 12A and 12B, the breather hole 116 of the housing 88 (see FIG. 7) is also not aligned with each small hole. With this arrangement, a flow path of the air from the outside to the inside of the magnetic disk drive can be increased in length, thereby more suppressing the entry of metal corrosive gas and moisture from the outside to the inside of the magnetic disk drive.

Figure 13:
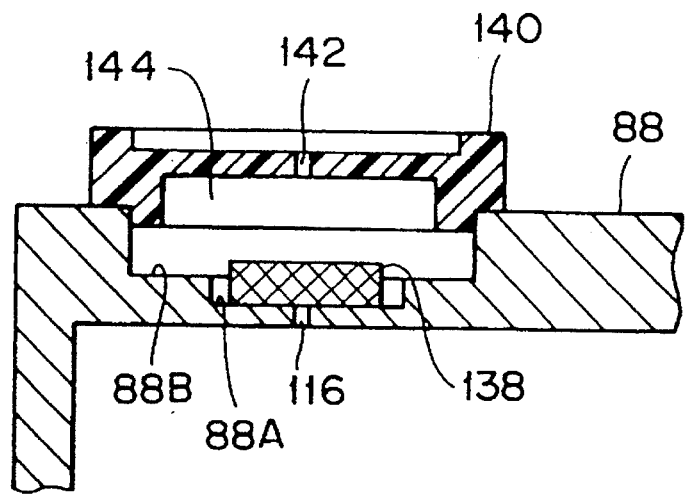
FIG. 13 is a sectional view of a portion of a magnetic disk drive in the vicinity of a breather hole according to an eighth preferred embodiment of the present invention wherein a part of a breather filter unit is formed integrally with a housing of the disk drive.

While the breather filter unit is formed independently of the housing in each of the previous preferred embodiments, a part of the breather filter unit may be formed integrally with the housing. Specific embodiments of such an integral structure will now be described with reference to FIGS. 13 and 14. FIG. 13 is a sectional view of a portion of the magnetic disk drive in the vicinity of the breather hole according to an eighth preferred embodiment of the present invention. As similar to the preferred embodiment shown in FIG. 7, the housing 88 has the thin-walled portion 88A, and the thin-walled portion 88A has the breather hole 116. Another thin-walled portion 88B having a thickness larger than that of the thin-walled portion 88A and smaller than that of the other wall portion of the housing 88 is formed around the thin-walled portion 88A. A filter 138 is provided on the thin-walled portion 88A so as to face the breather hole 116. The filter 138 functions to prevent dust from passing through the breather hole 116 and also prevent metal corrosive gas from passing through the breather hole 116.

A unit cover 140 for defining a first expansion chamber 144 in cooperation with the housing 88 is mounted on the housing 88 so as to be opposed to the filter 138. The unit cover 140 has a small hole 142 for making the first expansion chamber 144 communicate with the outside of the housing 88. Also in this preferred embodiment, the entry of dust and metal corrosive gas into the magnetic disk drive can be prevented with a simple structure in accordance with the principle similar to that in the previous preferred embodiments.

Figure 14:
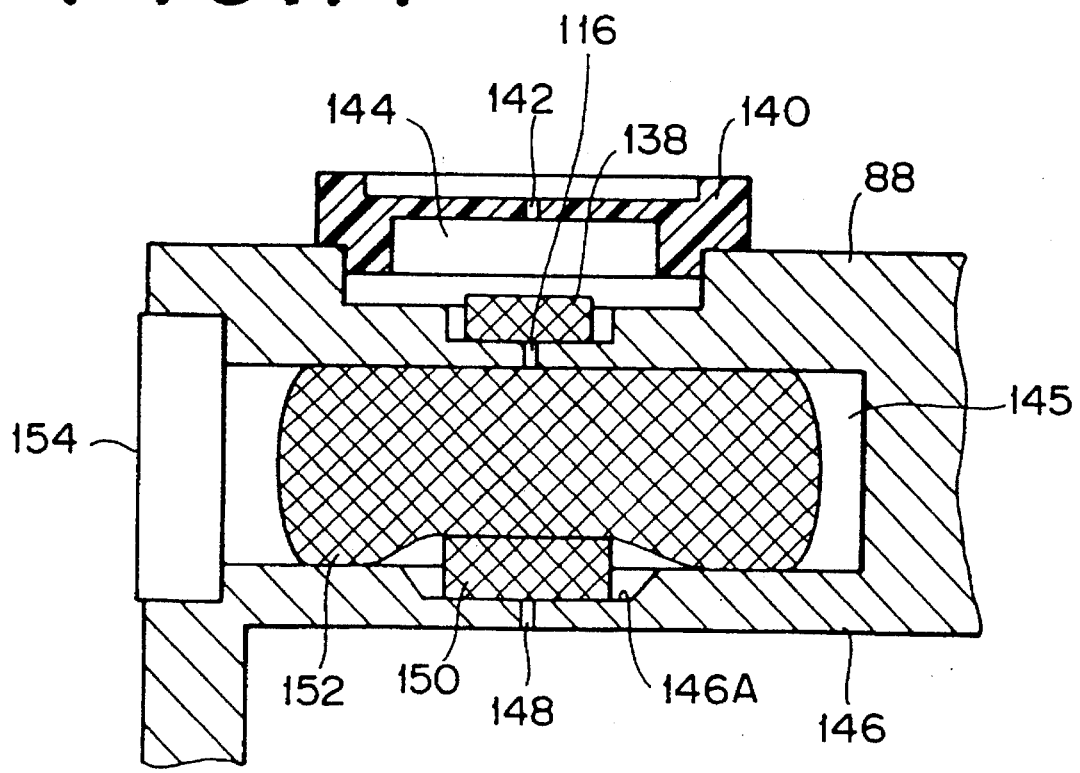
FIG. 14 is a sectional view similar to FIG. 13, showing a ninth preferred embodiment of the present invention.

FIG. 14 is a sectional view similar to FIG. 13, showing a ninth preferred embodiment of the present invention. In addition to the structure shown in FIG. 13, a unit wall 146 integral with the housing 88 is formed to define a second expansion chamber 145 therein. The unit wall 146 is formed with a thin-walled portion 146A, and the thin-walled portion 146A is formed with a small hole 148. The small hole 148 provides communication between the second expansion chamber 145 and the inside of the housing 88. The breather hole 116 provides communication between the first expansion chamber 144 and the second expansion chamber 145.

A filter 150 is provided on the thin-walled portion 146A so as to face the small hole 148. The filter 150 functions similarly to the filter 138. A gas adsorbent or drying agent 152 is contained in the second expansion chamber 145. Reference numeral 154 denotes a removable lid for use in replacing the gas adsorbent or drying agent 152 by another from the outside of the housing 88. The lid 154 is formed as a screw lid, for example, thereby ensuring the sealability of the second expansion chamber 145.

According to this preferred embodiment, the second expansion chamber 145 is added to the structure of the preferred embodiment shown in FIG. 13, thereby improving the tolerance of the magnetic disk drive against metal corrosive gas. Furthermore, since the gas adsorbent or drying agent 152 is contained in the second expansion chamber 145 as required, the desired function of the breather filter unit can be exhibited. In comparison with the previous preferred embodiments wherein the breather filter unit is formed independently of the housing, the preferred embodiments shown in FIGS. 13 and 14 can make the structure simpler, thereby greatly contributing to a reduction in cost of the magnetic disk drive.

According to the present invention, corrosive gas in the air can be efficiently removed by adsorption by using activated carbon in an amount less than that in the related art in combination with a fibrous filter and usual filters, thereby introducing a purified air into the magnetic disk drive. In addition, the present invention can provide a breather filter unit having a small size and a simple structure.

What is claimed is:

1. A breather filter unit for a magnetic disk drive including a base and a cover fixed to said base, said cover having a vent, said breather filter unit comprising:

a casing fixed to an inner surface of said cover, said casing having a vent inlet communicating with said vent of said cover and a vent outlet communicating with an inside of said magnetic disk drive, said vent outlet being opposed to said vent inlet;

a first filter contained in said casing at a position adjacent to said vent inlet, said first filter comprising a plurality of fibers extending in a direction substantially parallel to that of an air flow from said vent inlet toward said vent outlet;

a second filter bonded to said casing so as to cover said vent outlet; and an activated carbon layer contained in said casing at a position between said first filter and said second filter.

2. A breather filter unit for a magnetic disk drive according to claim 1, wherein silica gel is mixed in said activated carbon layer.

3. A breather filter unit for a magnetic disk drive according to claim 1, further comprising a third filter bonded to said casing so as to cover said vent inlet.

4. A breather filter unit for a magnetic disk drive according to claim 3, further comprising a protective net provided between said second filter and said activated carbon layer.

5. A breather filter unit for a magnetic disk drive according to claim 4, further comprising a fourth filter provided between said first filter and said activated carbon layer.

6. A breather filter unit for a magnetic disk drive including a base and a cover fixed to said base, said cover having a vent, said breather filter unit comprising:

a casing fixed to an inner surface of said cover, said casing having a vent inlet communicating with said vent of said cover and a vent outlet communicating with an inside of said magnetic disk drive, said vent outlet being opposed to said vent inlet;

a first filter contained in said casing at a position adjacent to said vent inlet, said first filter comprising a plurality of fibers extending in a direction substantially parallel to that of an air flow from said vent inlet toward said vent outlet; and a filter bag contained in said casing at a position adjacent to said vent outlet, said filter bag containing activated carbon therein.

7. A breather filter unit for a magnetic disk drive according to claim 6, wherein said filter bag further contains silica gel.

8. A breather filter unit for a magnetic disk drive according to claim 6, further comprising a second filter bonded to said casing so as to cover said vent inlet.

* * * * *

UNITED STATES PATENT AND TRADEMARK OFFICE
CERTIFICATE OF CORRECTION

PATENT NO. : 5,590,001
DATED : December 31, 1996
INVENTOR(S) : Ino et al.

It is certified that error appears in the above-indentified patent and that said Letters Patent is hereby corrected as shown below:

On the Title Page:

Under "[75] Inventors", delete "Masaharu Sugimoto; Yoshiaki Nagasawa; Katsuaki Ishida; Osamu Yamazaki; Yukihiro Komura; Tomoo Sukagawa, Higashine"

Under "[56] References Cited" for "Foreign Patent Documents", insert --3-295094, 12/1991, Japan; 5-109260, 4/1993, Japan; 62-175987, 8/1987, Japan; 62-184685, 8/1987, Japan;

UNITED STATES PATENT AND TRADEMARK OFFICE
CERTIFICATE OF CORRECTION

PATENT NO. : 5,590,001
DATED : December 31, 1996
INVENTOR(S) : Ino et al.

It is certified that error appears in the above-indentified patent and that said Letters Patent is hereby corrected as shown below:

3- 219488, 9/1991, Japan; 2-240893, 9/1990, Japan; 62-

281186, 12/1987, Japan--

Signed and Sealed this

Second Day of September, 1997

Attest:

BRUCE LEHMAN

Attesting Officer       Commissioner of Patents and Trademarks